Sept. 11, 1923.
J. LUMB
VALVE FOR USE IN CONNECTION WITH PNEUMATIC TIRES APPLICABLE FOR OTHER SUITABLE PURPOSES
Filed March 13, 1922
1,467,440
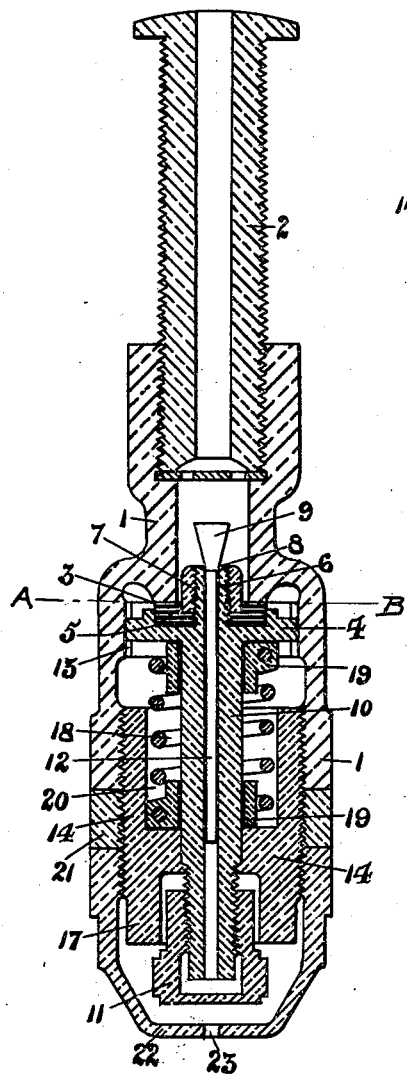
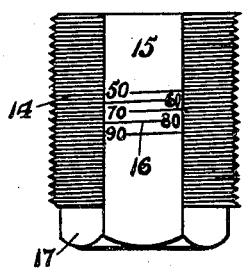
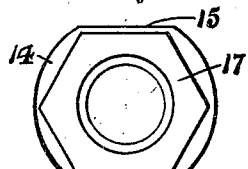
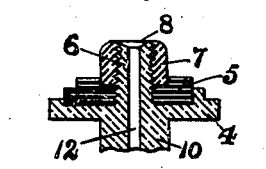
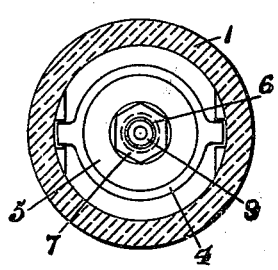
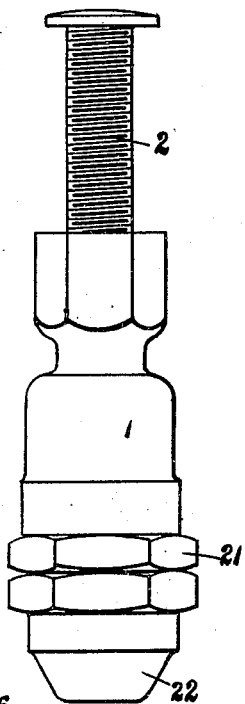
WITNESSES
Abr Reed
Charles Sutcliffe
INVENTOR
FOR JAMES LUMB
John A Walsh
Attorney Patented Sept. 11, 1923.

1,467,440

UNITED STATES PATENT OFFICE.

JAMES LUMB, OF ELLAND, ENGLAND.

VALVE FOR USE IN CONNECTION WITH PNEUMATIC TIRES APPLICABLE FOR OTHER SUITABLE PURPOSES.

Application filed March 13, 1922. Serial No. 543,342.

*To all whom it may concern:*

Be it known that I, JAMES LUMB, a subject of the King of Great Britain, residing at Elland, in the county of York, England, have invented new and useful improvements entitled an Improved Valve for Use in Connection with Pneumatic Tires Applicable for Other Suitable Purposes, of which the following is a specification.

This invention relates more particularly to an improved construction of valve relating to air tubes of pneumatic tires for motor road vehicles, but it is equally applicable for other purposes where it is required to automatically relieve fluid pressure should the latter from any cause exceed a predetermined amount.

The object of my invention is to obviate this excessive pressure by providing a valve which will automatically relieve the same when it exceeds the normal, and which will become inoperative immediately the pressure again becomes normal. With the use of my improved valve uniformity of inflation may be secured in a set of tires, and a better running of the vehicle obtained.

I attain these objects by the mechanism illustrated in the accompanying drawing in which: Fig. 1 is an enlarged longitudinal section of my improved valve, showing the same screwed on the customary projecting shank or nipple connected with the air tube; Fig. 2 is a cross section of Fig. 1, through the line A. B; Fig. 3 is a full size elevation of Fig. 1; Fig. 4, is an elevation of the regulating plug showing a gradatory scale upon the side thereof; Fig. 5, is a plan view of Fig. 4 showing the plug with flats formed upon opposite sides; and Fig. 6 is a sectional elevation of relief valve, showing means for holding the leather or other washer upon the face thereof.

Similar letters refer to similar parts throughout the several views.

Referring to the drawing, 1 is the case or shell shown screwed on to the shank or nipple 2 connected with the air tube and normally passing through the rim or felloe of the wheel to which it is secured by the usual lock-nut. 3 is a seat formed in the said case, adapted to receive an escape valve 4 faced with rubber, leather or the like 5. The washer 5 is held upon its seat by a nut 7 which engages same when being screwed onto an externally threaded pap or boss 6 on the said valve containing the seat 8 of the customary rubber air valve 9, and has a stem or sleeve 10 threaded at the other end to receive the nipple of the air pump, or the cap 11. The stem 10 is bored its whole length and houses the air valve stem 12 of the valve 9. The interior of the casing 1 adjacent its upper end is preferably provided with a pair of vertical recesses 13, which act as guideways for the projecting lugs 13' formed on the valve 4, as shown in Fig. 2. It will be seen that by reason of the guideway formed for the valve 4, the rotation of the latter relative to the casing is prevented. Suitable clearances are provided between the sides of the valve 4 and the case 1, and between the plug 14 and the stem 10 to permit air passing the valve 4 to reach the atmosphere. The plug 14 is a regulating plug externally threaded and screwing into the case 1; it is bored to receive the stem and has flats 15 on opposite sides upon which are the gradatory scales or indicators 16, enabling said plug to regulate the pressure within the air tube in accordance with the predetermined pressure desired. 17 is a hexagon or the like nut formed upon the plug for the purpose of adjustment. 18 is a spring connected at each end to collars 19, loosely mounted upon the stem 10 between the valve 4 and the bottom of a recess 20 in the plug 14. The pressure exerted by the spring upon the underside of the valve 4 for holding the latter upon its seat, is regulated, after removing a lock nut and a cover 22, by screwing the plug up or down the case 1, until the pressure line indicating the pressure desired, is in line with the base of said case 1. 21 is the lock nut, and the cover 22 is provided with an outlet 23 for the surplus air escaping past the valve 4.

To inflate the tire the cover 22 and cap 11 are removed and the lock nut 21 slackened, the spring 18 which is of the desired strength, is next adjusted in accordance with the pressure in the tire which is desired, by screwing the plug up or down the casing 1, the amount of adjustment being determined by the indicator 16 on the flats 15 formed on the sides of the plug showing variations of 10 lbs. in pressures. The locknut 21 is again tightened and pumping of air into the tube may then commence. Immediately the predetermined pressure therein is exceeded the valve 4 is forced off its seat until the pressure again becomes normal, when the valve closes. In the event of the adjustment being accurate and uniform in each wheel the cushion in each tire is uniform and increased efficiency in running is obtained. The invention is equally applicable for dealing with excess pressures in the holders of air compressors or similar fluid containers.

What I claim as my invention and desire to secure by Letters Patent is:—

1. In a valve of the class described, the combination with a casing having a reduced neck, a central bore in said neck communicating with said casing, a plug adjustably secured to the interior of said casing provided in its opposed ends with recesses of different diameters, a port connecting said recesses, a valve stem having a central passage traversing said casing, an annular valve adjacent the upper end of said stem adapted to close the port in said neck, means for preventing rotation of said valve relative to the casing, a spring supported in one of said recesses for normally maintaining the valve closed, an inlet valve in said passage, a cap secured to the lower portion of said valve stem and extending within the other of said recesses for closing said central passage, a cover threadedly secured to the outer surface of said plug, and a lock nut interposed between said cover and said casing for locking the plug in a predetermined position relative to said casing.

2. In a valve of the class described, the combination with a casing having a reduced neck, a central bore in said neck communicating with said casing, a plug adjustably secured to the interior of said casing provided in its opposed ends with recesses of different diameters, a graduatory scale formed in the outer surface of said plug, a port connecting said recesses, a valve stem having a central passage traversing said casing, an annular valve adjacent the upper end of said stem adapted to close the port in said neck, means for preventing rotation of said valve relative to the casing, a spring supported in one of said recesses for normally maintaining the valve closed, an inlet valve in said passage, a cap secured to the lower portion of said valve stem and extending within the other of said recesses for closing said central passage, a cover threadedly secured to the outer surface of said plug, and a lock nut interposed between said cover and said casing for locking the plug in a predetermined position relative to said casing.

In testimony whereof I hereunto affix my signature.

JAMES LUMB.